United States Patent
Rajendran et al.

(10) Patent No.: US 11,952,732 B2
(45) Date of Patent: Apr. 9, 2024

(54) RETRO-REFLECTIVE RAISED PAVEMENT MARKER AND A METHOD OF MANUFACTURING THEREOF

(71) Applicant: 3M INNOVATIVE PROPERTIES COMPANY, St. Paul, MN (US)

(72) Inventors: Santhosh Kumar Rajendran, Karnataka (IN); Vipulkumar Himatbhai Prajapati, Gujarat (IN); Govindarajan Ganesan, Hosur (IN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 898 days.

(21) Appl. No.: 16/966,343

(22) PCT Filed: Jan. 28, 2019

(86) PCT No.: PCT/IB2019/050681
§ 371 (c)(1),
(2) Date: Jul. 30, 2020

(87) PCT Pub. No.: WO2019/150244
PCT Pub. Date: Aug. 8, 2019

(65) Prior Publication Data
US 2020/0370253 A1    Nov. 26, 2020

(30) Foreign Application Priority Data
Jan. 30, 2018    (IN) .............................. 201841003353

(51) Int. Cl.
*E01F 9/00* (2016.01)
*B29C 65/08* (2006.01)
(Continued)

(52) U.S. Cl.
CPC .............. *E01F 9/553* (2016.02); *B29C 65/08* (2013.01); *E01F 9/524* (2016.02);
(Continued)

(58) Field of Classification Search
CPC .......... E01F 9/524; E01F 9/553; B29C 65/08; B29K 2995/003; B29L 2011/0083; G02B 5/12
(Continued)

(56) References Cited

U.S. PATENT DOCUMENTS 1,850,370 A * 3/1932 Arey ....................... E01F 9/553
                                                        359/547
5,340,231 A    8/1994 Steere
(Continued)

FOREIGN PATENT DOCUMENTS

| CN | 2586723 Y | 11/2003 |
| EP | 0724670 | 8/1996 |
| EP | 0835348 | 4/1998 |

OTHER PUBLICATIONS

International Search Report for PCT International Application No. PCT/IB2019/050681, dated Jul. 29, 2019, 2 pages.

*Primary Examiner* — Raymond W Addie

(57) ABSTRACT

Embodiments of the present disclosure relate to a retro-reflective raised pavement marker (100) and a method of manufacturing (200) thereof. The marker (100) comprises a marker body (1), at least one intermediate frame (6), and at least one retro-reflective lens (7) such that the marker body (1) completely houses the at least one intermediate frame (6) and the at least one retro-reflective lens (7). Further, the manufactured marker (100) is durable, effective and has better retention with the ground surface and better load distribution to the ground.

19 Claims, 4 Drawing Sheets

(51) Int. Cl.
    *E01F 9/524*     (2016.01)
    *E01F 9/553*     (2016.01)
    *B29L 11/00*     (2006.01)
    *G02B 5/12*     (2006.01)

(52) U.S. Cl.
    CPC . *B29K 2995/003* (2013.01); *B29L 2011/0083* (2013.01); *G02B 5/12* (2013.01)

(58) Field of Classification Search
    USPC .............................................. 404/12–16, 72
    See application file for complete search history.

(56) References Cited

U.S. PATENT DOCUMENTS

| | | | |
|---|---|---|---|
| 5,392,728 | A | 2/1995 | Speer |
| 6,126,360 | A | 10/2000 | May |
| 6,334,734 | B1* | 1/2002 | Attar ........................ E01F 9/553 404/12 |
| 7,025,528 | B1* | 4/2006 | Attar ........................ E01F 9/553 404/15 |
| 8,840,335 | B2* | 9/2014 | Martin ................... G08G 1/095 404/12 |
| 2011/0085855 | A1 | 4/2011 | Amaya |
| 2013/0170906 | A1 | 7/2013 | Lee |
| 2014/0197955 | A1 | 7/2014 | Martin |
| 2017/0002526 | A1 | 1/2017 | Hernandez Santacruz |

\* cited by examiner

RETRO-REFLECTIVE RAISED PAVEMENT MARKER AND A METHOD OF MANUFACTURING THEREOF

CROSS REFERENCE TO RELATED APPLICATIONS

This application is a national stage filing under 35 U.S.C. 371 of PCT/IB2019/050681, filed Jan. 28, 2019, which claims the benefit of India Application No. 201841003353, filed Jan. 30, 2018, the disclosure of both of which is incorporated by reference in their entirety herein.

TECHNICAL FIELD

The present disclosure relates to a raised pavement marker. More particularly, the present disclosure relates to a retro-reflective raised pavement marker.

BACKGROUND

Raised pavement markers are a widely known road infrastructure which helps in providing visual indications to a driver while driving a vehicle. Raised pavement markers help in indicating traffic lanes, and simultaneously act as speed breakers. Of the various available markers, the most effective and most widely used are retro-reflective raised pavement markers. The retro-reflective raised pavement markers reflect light emanating from a headlight of an oncoming vehicle back to the driver of the vehicle to provide a visual indication for the drive. However, there are many challenges associated with said retro-reflective raised pavement markers. Firstly, the known retro-reflective raised pavement markers suffer from poor adhesion to a ground surface. Secondly, reflective lens of the known retro-reflective raised pavement markers gets damaged due to a direct impact of load from the vehicle. Thirdly, water ingresses through the damaged lens cause faster deterioration of the marker. Lastly, replacement of the damaged lens increases the expenditure for the effective use of the markers.

Therefore, there is a requirement of an improved retro-reflective pavement marker which is durable, effective and has better retention to the ground.

SUMMARY

An aspect of the present disclosure relates to a retro-reflective raised pavement marker. The marker comprises a marker body having a top wall, a bottom wall, and a plurality of side walls, wherein the top wall comprises a plurality of ridges, the bottom wall comprises a plurality of undercut recesses, the plurality of side walls connect edges of the top wall to edges of the bottom wall at an acute angle with respect to the top wall, and at least one of the plurality of side walls comprises a lip portion at the edges of the bottom wall such that the ridges and the lip portion form a recessed portion on the at least one of the plurality of side walls. The marker also comprises at least one intermediate frame, having weld lines, fixed to the recessed portion on the at least one of the plurality of side walls. Furthermore, the marker comprises at least one retro-reflective lens fixed on the at least one intermediate frame.

Another aspect of the present disclosure relates to a method of manufacturing a retro-reflective raised pavement marker, the method comprising the steps of: producing a marker body with a top wall, a bottom wall, and a plurality of side walls such that at least one of the plurality of side walls connect edges of the top wall to edges of the bottom wall at an acute angle with respect to the top wall. This step is followed by forming a plurality of ridges on the top wall and a plurality of undercut recesses on the bottom wall. Subsequent step involves forming a lip portion, on the at least one of the plurality of side walls, at the edges of the bottom wall such that the ridges and the lip portion form a recessed portion on the at least one of the plurality of side walls. Further step includes fixing at least one intermediate frame, having weld lines, to the recessed portion of the at least one of the plurality of side walls. Lastly, the final step involves fixing at least one retro-reflective lens to the at least one intermediate frame.

Further, the present disclosure discloses a retro-reflective raised pavement marker which is durable, effective and has better retention with the ground surface and better load distribution to the ground.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
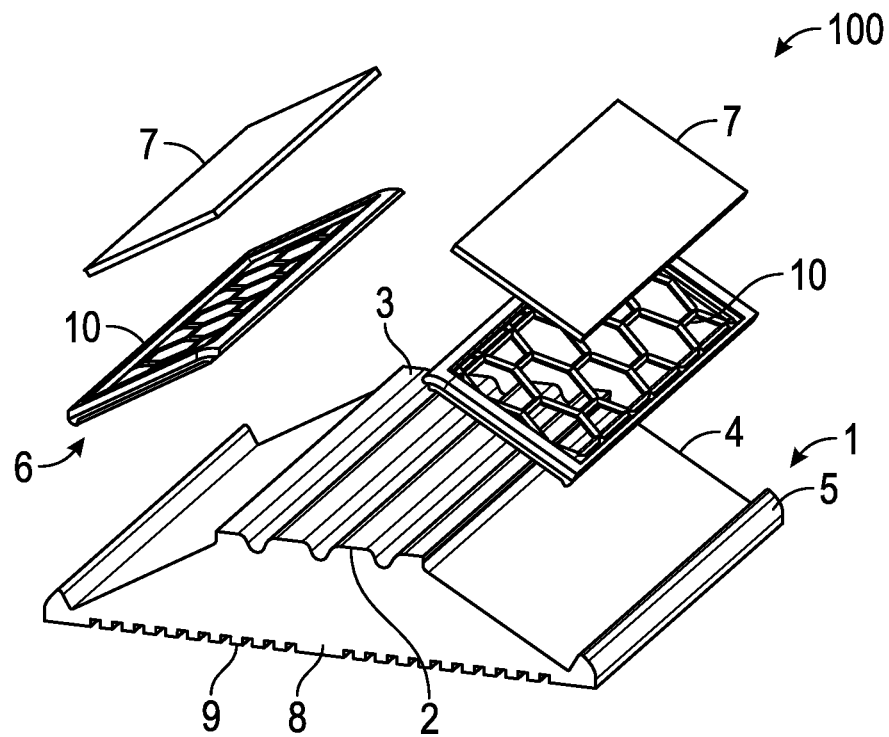
FIG. 1 shows an exploded view of raised pavement marker.

The present disclosure in general relates to a retro-reflective raised pavement marker. FIG. 1 illustrates an exploded view of a retro-reflective raised pavement marker (100). The marker (100) comprises a marker body (1), at least one intermediate frame (6), and at least one retro-reflective lens (7).

Figure 2:
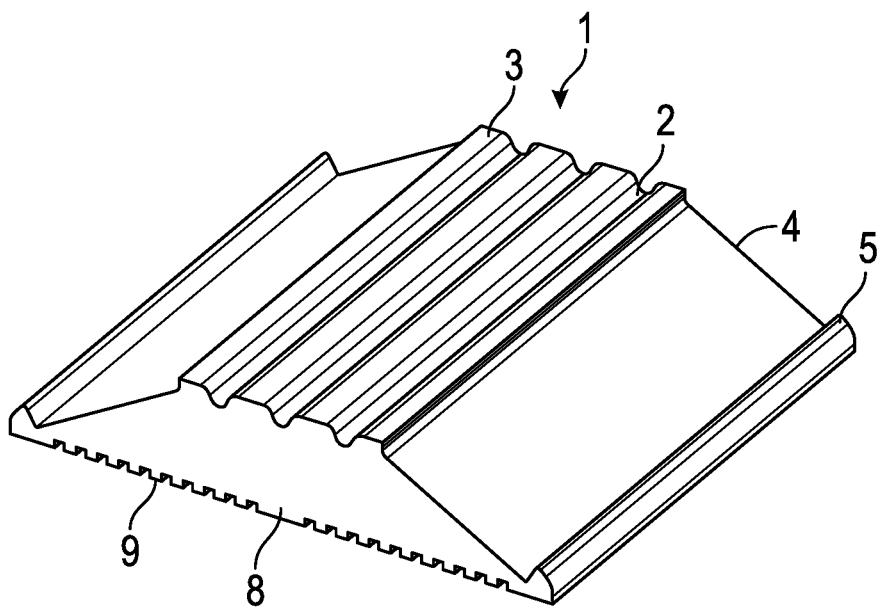
FIG. 2 shows an isometric view of the marker body of the raised pavement marker.
Figure 3:
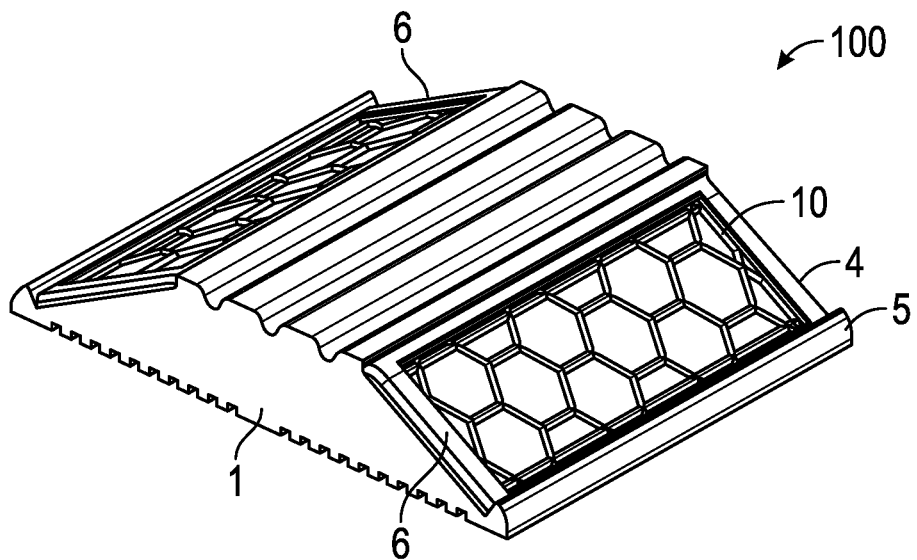
FIG. 3 shows a raised pavement marker having intermediate frame with weld lines in form of honey comb structure.
Figure 4:
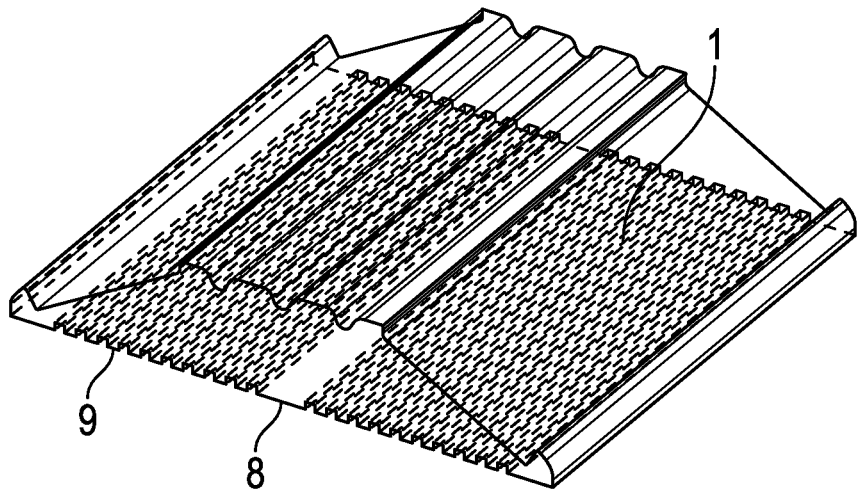
FIG. 4 shows another view of the marker body having undercuts formed in the bottom wall.

Further, FIGS. 2-4 illustrates an isometric view of the marker body (1). The marker body (1) may be a unitary body or modular in nature. The marker body (1) is made of an impact resistant material such as, but not limited to, Acrylonitrile Butadiene Styrene (ABS), Acrylonitrile styrene acrylate (ASA), Acrylic, Poly (methyl methacrylate) (PMMA), Polycarbonates (PC). In an embodiment, the marker body (1) may be produced using at least one of an extrusion process, an injection molding process, and a compression process. As illustrated in FIG. 1-4, the marker body (1) comprises a top wall (2), a bottom wall (8), and a plurality of side walls (4). The marker body (1) may include, but not limited to a, a trapezoidal cross section, a prismatic cross section, and a triangular cross section. In an embodiment, as shown in FIG. 1-4, the marker body (1) has a trapezoidal cross section. The top wall (2) comprises a plurality of ridges (3) and grooves. The plurality of ridges (3) and grooves helps in equally distributing the load to the marker body (1). The plurality of ridges (3) may be, but not limited to, square shaped, rectangular shaped, semi-circular shaped, and triangular shaped. In another embodiment, the plurality of ridges (3) may be symmetrically curved. The top wall (2) of the marker body (1) is generally placed parallel to a ground surface.

Figure 6:
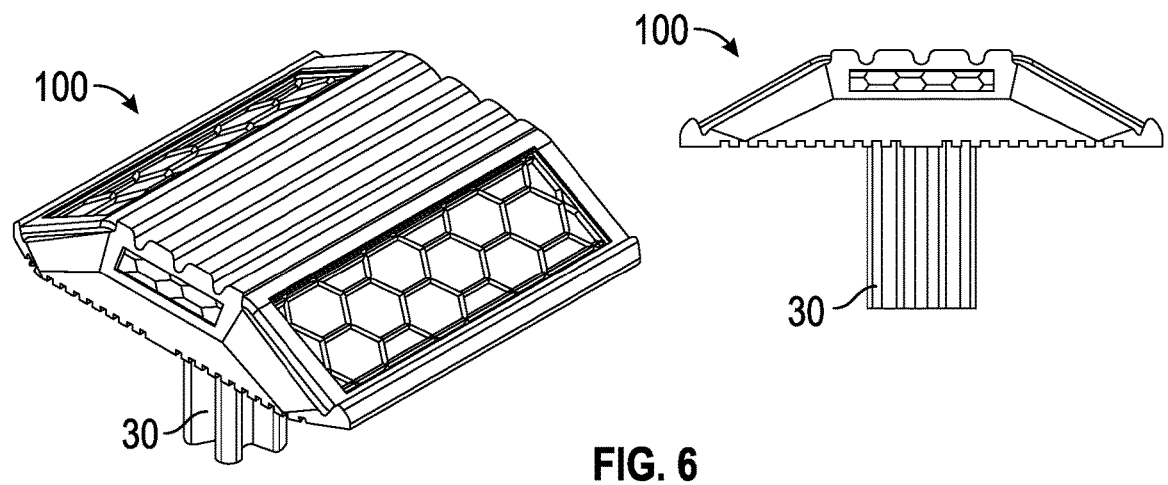
FIG. 6 shows an isometric view of raised pavement marker with a shank, in accordance to an embodiment of the present disclosure.

The bottom wall (8) is the wall which comes into physical contact of the ground surface. The bottom wall (8) comprises a plurality of undercut recesses (9) (as shown in FIG. 1-4). The plurality of undercut recesses (9), in particular, gets affixed on to the ground surface and helps in effective adhesion to the ground surface. The plurality of undercut recesses (9) may be, but not limited to, square shaped, rectangular shaped, semi-circular shaped, and triangular shaped. In an embodiment, at least one shank (30) (as shown in FIG. 6) protrudes outwards towards the ground surface. The at least one shank (30) helps in achieving a better anchorage to the marker body (1). Further, the at least one shank (30) may comprise a plurality of ribs to increase the gripping of the at least one shank (30) to the ground surface. The at least one shank (30) is connected to the bottom wall (8) using at least one of friction welding and spin welding. The at least one shank (30) may be, but not limited to a, cylindrically shaped, cuboidal shaped, and conical shaped.

The plurality of side wall (4) is configured to connect edges of the top wall (2) to edges of the bottom wall (8) at an acute angle with respect to the top wall (2). The angle may vary from 10 degree to 80 degree. Preferably, the angle may vary from 15 degree to 45 degree. Further, at least one of the plurality of side walls (4) comprises a lip portion (5) at the edges of the bottom wall (8) such that the ridges (3) and the lip portion (5) form a recessed portion (20) on the at least one of the plurality of side walls (4). The lip portion (5) is formed such a way that a first physical impact of a load on the marker (100) is received by the lip portion (5) itself. In another embodiment, the lip portion (50) and the ridges (3) may receive the first physical impact of the load on marker (100). The first physical impact of the load on the lip portion (50) and the ridges (3) prevent the at least one retro-reflective lens (7) from breaking, and thereby increases the life span of the at least one retro-reflective lens (7).

Further, the recessed portion (20) acts as a cavity of completely housing the at least one intermediate frame (6) and the at least one retro-reflective lens (7).

Figure 5:
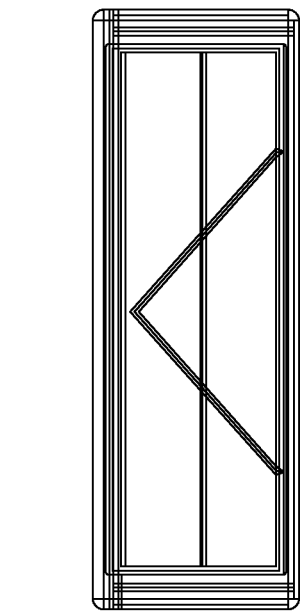
FIG. 5 shows a view of intermediate frame with various shapes of weld lines.
Figure 5:
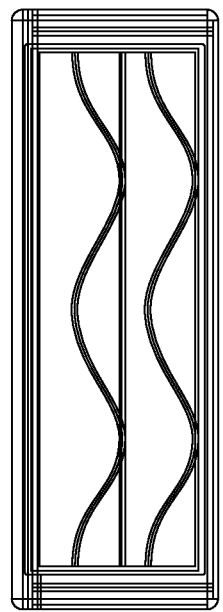
Figure 5:
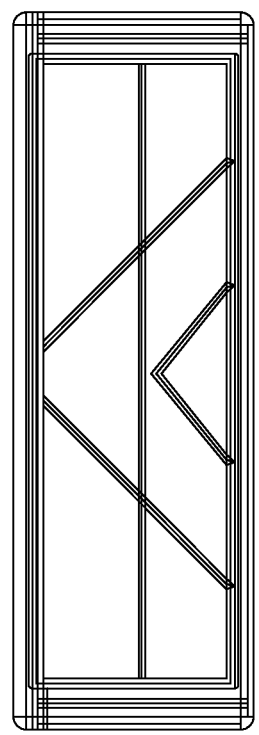
Figure 5:
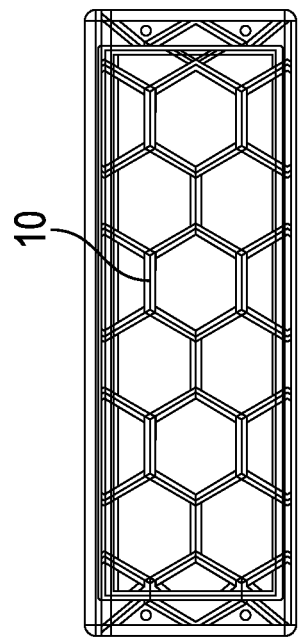
Figure 5:
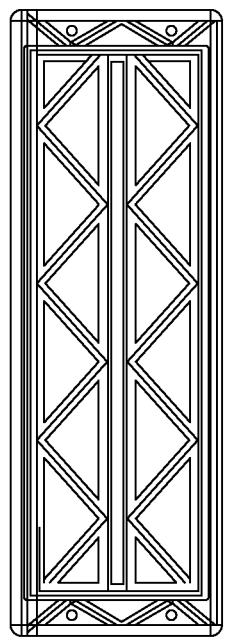

The at least one intermediate frame (6) is frame which is fixed to the recessed portion (20) on the at least one of the plurality of the side walls (7). The at least one intermediate frame (6) encompasses a plurality of weld lines (10) inter-webbed to each other. The plurality of weld lines (10) is inter-webbed to each other by ultrasonic welding resulting in formation of various compartments (as shown in FIG. 5). The weld lines (10) may have different shapes, but not limited to, such as honeycomb, octagonal, triangular, trapezoidal, and circular. The at least one intermediate frame (6) may be made of, but not limited to, Acrylonitrile Butadiene Styrene (ABS), Acrylonitrile styrene acrylate (ASA), Acrylic, Poly (methyl methacrylate) (PMMA), Polycarbonates (PC). Further, the at least one intermediate frame (6) may be ultrasonically welded to the at least one of the plurality of side walls (4).

Furthermore, the at least one retro-reflective lens (7) is made impact resistant material. The material may include, but not limited to,—Acrylic, Poly (methyl methacrylate) (PMMA), Polycarbonates (PC). In addition, the at least one retro-reflective lens (7) is fixed on the at least one intermediate frame (6) along the weld lines (10). In an embodiment, the at least one retro-reflective lens (7) is fixed on the at least one intermediate frame (6) using ultrasonic welding along the weld lines (10). Furthermore, the at least one retro-reflective lens (7) is connected to the at least one intermediate frame (6) such that the at least one retro-reflective lens (7) acts as an undercut surface between the ridges (3) and the lip portion (5).

Further, the various compartments formed due to the connection of the plurality of weld lines (10) helps to compartmentalize the damage incurred by the retro-reflective lens (7) to a single compartment. Therefore, localization further controls the damage along the length and breadth of the retro-reflective lens (7). The compartmentalization of damage within the weld lines (10) further protects the retro-reflective lens (7) from incurring damages from dust or water ingress. Further, the compartmentalization helps in restricting the chipping of the lens (7) as a whole also.

In an embodiment, the marker (100) comprises the top wall (2), the bottom wall (8), and a first side wall, a second side wall, a third side wall, and a fourth side wall. The first side wall and the third side wall are the opposite side walls. Similarly, the second side wall and the fourth side wall are opposite to each other. The first side wall and the third side wall comprise the lip portion (5) which creates the recessed portion (20) at both the first side wall and the third side wall. Further, the recessed portion (20) houses both the at least one intermediate frame (6) and at least one retro-reflective lens (7).

Figure 7:
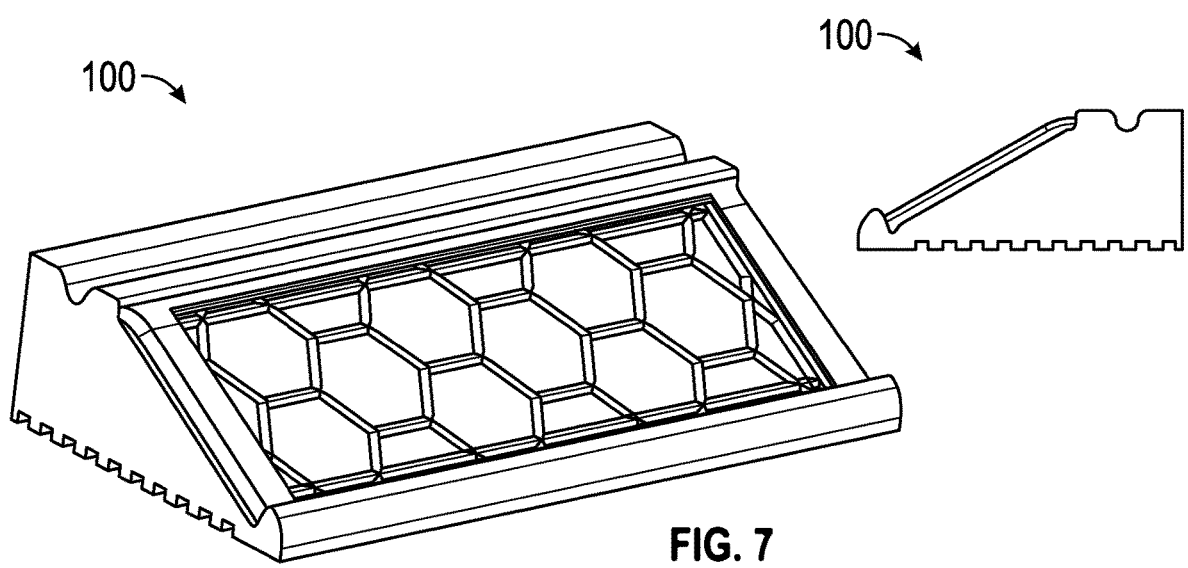
FIG. 7 shows an isometric view of raised pavement marker, in accordance to an embodiment of the present disclosure.

In another embodiment, as shown in FIG. 7, only the first side wall comprises the lip portion (5) which creates the recessed portion (20) on the first side wall. Further, the recessed portion (20) houses both the at least one intermediate frame (6) and at least one retro-reflective lens (7).

In yet another embodiment, the first side wall, the second side wall, and the fourth side wall comprise of the lip portion (5). Further, the recessed portion (20) houses both the at least one intermediate frame (6) and at least one retro-reflective lens (7).

In another embodiment, the first side wall, the second side wall, the third side wall, and the fourth side wall comprise the lip portion (5). Further, the recessed portion (20) houses both the at least one intermediate frame (6) and at least one retro-reflective lens (7).

In another embodiment, each of the first side wall, the second side wall, the third side wall, and the fourth side wall comprise two intermediate retro-reflective lens (7) each. This further decreases the chipping of the lens (7) as a whole also.

Further, a Finite Element (FE) analysis of the pavement marker was conducted considering load and boundary conditions on the top wall (2) surface of the marker body (1) with the bottom wall (8) fixed. The analysis revealed that the load was distributed along the ridges (3) on the top wall (2) surface of the marker body (1) to the ground. The point load on the top wall (2) of the marker body (1) was transferred to the bottom of the marker body (1) instead of the retro-reflective lens (7) area. The analysis also showed that the failure time of the present pavement marker invention is around 75% better than existing pavement markers.

The Finite Element (FE) analysis of the pavement marker according to the present invention shows that the load is directed to the ground efficiently and optimally thereby improving the ability of the pavement marker to withstand the heavy loads. Further, the Finite Element analysis and test results show that the variation in the stress distribution helps to increase the compression load withstanding capability of the pavement marker. Also, the controlled test condition further shows the shear off failure of the pavement marker of the present invention is along the bitumen and concrete surface, while the existing known product shows failure at the adhesive bond.

Furthermore, the present disclosure also relates to a method (200) of manufacturing a retro-reflective raised pavement marker (100). The method (200) starts with an initial step of producing a marker body (1) with a bottom wall (8), and a plurality of side walls (4) such that at least one of the plurality of side walls (4) connect edges of the top wall (2) to edges of the bottom wall (8) at an acute angle with respect to the top wall (2). The marker body (1) may be produced by at least one of an extrusion process, an injection molding process, and a compression process.

The subsequent step involves forming a plurality of ridges (3) on the top wall (2) and a plurality of undercut recesses (9) on the bottom wall (8). Further step involves forming a lip portion (5), on the at least one of the plurality of side walls (4), at the edges of the bottom wall (8) such that the ridges (3) and the lip portion (5) form a recessed portion (20) on the at least one of the plurality of side walls (4). Subsequent step involves fixing at least one intermediate frame (6), having weld lines (10), to the recessed portion (20) of the at least one of the plurality of side walls (4). In an embodiment, the at least one intermediate frame (6) is connected to the recessed portion (20 by ultrasonic welding.

Lastly, the final step involves fixing at least one retro-reflective lens (7) to the at least one intermediate frame (6). Similarly, in an embodiment, the at least one retro-reflective lens (7) is connected to the at least one intermediate frame (6) by ultrasonic welding, wherein the welding is made along the weld lines (10) of the intermediate frame (6).

The method (200) further involves a step of connecting at least one shank (3) to the bottom wall (8) using at least one of friction welding and spin welding.

Therefore, the present disclosure provides a retro-reflective raised pavement marker which is durable, has better retention with the ground surface and better load distribution to the ground.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific Embodiments shown and described without departing from the scope of the present disclosure. This application is intended to cover any adaptations or variations of the specific Embodiments discussed herein. Therefore, it is intended that this disclosure be limited only by the claims and the equivalents thereof.

EXEMPLARY EMBODIMENTS

The following are exemplary embodiments according to the present disclosure:

Embodiment 1

A retro-reflective raised pavement marker (100), the marker (100) comprising:
  a marker body (1) having a top wall (2), a bottom wall (8), and a plurality of side walls (4), wherein
    the top wall (2) comprises a plurality of ridges (3),
    the bottom wall (8) comprises a plurality of undercut recesses (9),
    the plurality of side walls (4) connect edges of the top wall (2) to edges of the bottom wall (8) at an acute angle with respect to the top wall (2), and at least one of the plurality of side walls (4) comprises a lip portion (5) at the edges of the bottom wall (8) such that the ridges (3) and the lip portion (5) form a recessed portion (20) on the at least one of the plurality of side walls (4);
  at least one intermediate frame (6), having weld lines (10), fixed to the recessed portion (20) on the at least one of the plurality of side walls (4); and
  at least one retro-reflective lens (7) fixed on the at least one intermediate frame (6).

Embodiment 2

The marker (100) as claimed in embodiment 1, wherein the intermediate frame (6) having the weld lines (10) is ultrasonically welded to the at least one of the plurality of side walls (4), and the retro-reflective lens (7) is ultrasonically welded to the intermediate frame (6).

Embodiment 3

The marker (100) as claimed in any of the preceding embodiments, wherein the ultrasonic welding is made along the weld lines (10) of the intermediate frame (6).

Embodiment 4

The marker (100) as claimed in any of the preceding embodiments, wherein the marker (100) comprises at least one shank (30) connected to the bottom wall (8).

Embodiment 5

The marker (100) as claimed in any of the preceding embodiments, wherein the at least one shank (300) comprises a plurality of ribs to increase the gripping of at least one shank (30) to a ground surface.

Embodiment 6

The marker (100) as claimed in any of the preceding embodiments, wherein the marker body (1) is produced using at least one of an extrusion process, an injection molding process, and a compression process.

Embodiment 7

The marker (100) as claimed in any of the preceding embodiments, wherein the bottom wall (8) having a plurality of undercut recesses (9) is affixed on to the ground surface.

Embodiment 8

The marker (100) as claimed in any of the preceding embodiments, wherein the lip portion (5) receives a first physical impact on actuation of a load on the marker (100).

Embodiment 9

The marker (100) as claimed in any of the preceding embodiments, wherein the recessed portion (20) acts as a cavity for completely housing the at least one intermediate frame (6).

Embodiment 10

The marker (100) as claimed in any of the preceding embodiments, wherein the recessed portion (20) completely houses the at least one intermediate frame (6) and the at least one retro-reflective lens (7).

Embodiment 11

The marker (100) as claimed in any of the preceding embodiments, wherein the at least one retro-reflective lens (7), connected to the at least one intermediate frame (6), acts as an undercut surface between the ridges (3) and the lip portion (5).

Embodiment 12

The marker (100) as claimed in any of the preceding embodiments, the acute angle varies from 10 degree to 80 degree, preferably from 15 degree to 45 degree.

Embodiment 13

The marker (100) as claimed in any of the preceding embodiments, wherein the weld lines (10) helps in compartmentalizing the damage incurred to the at least one retro-reflective lens (7) on actuation of the load.

Embodiment 14

A method (200) of manufacturing a retro-reflective raised pavement marker (100), the method (200) comprising the steps of:
  producing a marker body (1) with a top wall (2), a bottom wall (8), and a plurality of side walls (4) such that at least one of the plurality of side walls (4) connect edges of the top wall (2) to edges of the bottom wall (8) at an acute angle with respect to the top wall (2);
  forming a plurality of ridges (3) on the top wall (2) and a plurality of undercut recesses (9) on the bottom wall (8);
  forming a lip portion (5), on the at least one of the plurality of side walls (4), at the edges of the bottom wall (8) such that the ridges (3) and the lip portion (5) form a recessed portion (20) on the at least one of the plurality of side walls (4);
  fixing at least one intermediate frame (6), having weld lines (10), to the recessed portion (20) of the at least one of the plurality of side walls (4); and
  fixing at least one retro-reflective lens (7) to the at least one intermediate frame (6).

Embodiment 15

The method (200) as claimed in any of the preceding embodiments directed to methods, wherein the at least one intermediate frame (6) is connected to the recessed portion (20) by ultrasonic welding.

Embodiment 16

The method (200) as claimed in any of the preceding embodiments directed to methods, wherein the at least one retro-reflective lens (7) is connected to the at least one intermediate frame (6) by ultrasonic welding.

Embodiment 17

The method as claimed in any of the preceding embodiments directed to methods, wherein the welding is made along the weld lines (10) of the intermediate frame (6).

Embodiment 18

The method (200) as claimed in any of the preceding embodiments directed to methods, wherein the method comprises connecting at least one shank (30) to the bottom wall (8) using at least one of friction welding and spin welding.

Embodiment 19

The method (200) as claimed in any of the preceding embodiments directed to methods, the acute angle varies from 10 degree to 80 degree, preferably from 15 degree to 45 degree.

Embodiment 20

The method (200) as claimed in any of the preceding embodiments directed to methods, wherein the lip portion (5) is formed such that the lip portion (5) receives a first physical impact on actuation of a load on the marker (100).

Embodiment 21

The method (200) as claimed in any of the preceding embodiments directed to methods, wherein the upward protruded lip portion (5) is formed such that the recessed portion (20) completely houses the at least one intermediate frame (6) and the at least one retro-reflective lens (7).

What is claimed is:
1. A retro-reflective raised pavement marker, the marker comprising:
  a marker body having a top wall, a bottom wall, and a plurality of side walls, wherein
    the top wall comprises a plurality of ridges,
    the bottom wall comprises a plurality of undercut recesses,
    the plurality of side walls connect edges of the top wall to edges of the bottom wall at an acute angle with respect to the top wall, and
    at least one of the plurality of side walls comprises a lip portion at the edges of the bottom wall such that the ridges and the lip portion form a recessed portion on the at least one of the plurality of side walls;

at least one intermediate frame, having weld lines, fixed to the recessed portion on the at least one of the plurality of side walls, wherein the weld lines are inter-webbed to each other; and at least one retro-reflective lens fixed on the at least one intermediate frame.

2. The marker as claimed in claim 1, wherein the intermediate frame having the weld lines is ultrasonically welded to the at least one of the plurality of side walls, and the retro-reflective lens is ultrasonically welded to the intermediate frame.

3. The marker as claimed in claim 2, wherein the ultrasonic welding is made along the weld lines of the intermediate frame.

4. The marker as claimed in claim 1, wherein the marker comprises at least one shank connected to the bottom wall.

5. The marker as claimed in claim 4, wherein the at least one shank comprises a plurality of ribs to increase the gripping of at least one shank to a ground surface.

6. The marker as claimed in claim 1, wherein the marker body is produced using at least one of an extrusion process, an injection molding process, and a compression process.

7. The marker as claimed in claim 1, wherein the bottom wall having a plurality of undercut recesses is affixed on to the ground surface.

8. The marker as claimed in claim 1, wherein the lip portion receives a first physical impact on actuation of a load on the marker.

9. The marker as claimed in claim 1, wherein the recessed portion acts as a cavity for completely housing the at least one intermediate frame.

10. The marker as claimed in claim 1, wherein the recessed portion completely houses the at least one intermediate frame and the at least one retro-reflective lens.

11. The marker as claimed in claim 1, wherein the at least one retro-reflective lens, connected to the at least one intermediate frame, acts as an undercut surface between the ridges and the lip portion.

12. The marker as claimed in claim 1, wherein the acute angle varies from 10 degree to 80 degree.

13. The marker as claimed in claim 2, wherein the weld lines help in compartmentalizing the damage incurred to the at least one retro-reflective lens on actuation of the load.

14. The marker as claimed in claim 1, wherein the weld lines have a honeycomb shape.

15. The marker as claimed in claim 1, wherein the weld lines have a triangular shape.

16. The marker as claimed in claim 1, wherein the weld lines have at least one of an octagonal, a trapezoidal, or a circular shape.

17. The marker as claimed in claim 1, wherein the weld lines have a wavy shape.

18. A method of manufacturing a retro-reflective raised pavement marker, the method comprising the steps of:

producing a marker body with a top wall, a bottom wall, and a plurality of side walls such that at least one of the plurality of side walls connect edges of the top wall to edges of the bottom wall at an acute angle with respect to the top wall;

forming a plurality of ridges on the top wall and a plurality of undercut recesses on the bottom wall;

forming a lip portion, on the at least one of the plurality of side walls, at the edges of the bottom wall such that the ridges and the lip portion form a recessed portion on the at least one of the plurality of side walls;

fixing at least one intermediate frame, having weld lines, to the recessed portion of the at least one of the plurality of side walls, wherein the weld lines are inter-webbed to each other; and fixing at least one retro-reflective lens to the at least one intermediate frame.

19. The method as claimed in claim 18, wherein the at least one intermediate frame is connected to the recessed portion by ultrasonic welding.

* * * * *